Sept. 20, 1971     J. B. MORRIS ET AL     3,606,221

AIRCRAFT ROCKET EJECTION SEAT SYSTEM

Filed April 1, 1970

JOHN B. MORRIS
FRANK H. WALLACE
INVENTORS

BY *J. M. St. Amand*

ATTORNEY

United States Patent Office 3,606,221
Patented Sept. 20, 1971

3,606,221
AIRCRAFT ROCKET EJECTION SEAT SYSTEM
John B. Morris, Reynoldsburg, Ohio, and Frank H. Wallace, Fort Walton Beach, Fla., assignors to the United States of America as represented by the Secretary of the Navy
Filed Apr. 1, 1970, Ser. No. 24,697
Int. Cl. B64d 25/10
U.S. Cl. 244—122  3 Claims

ABSTRACT OF THE DISCLOSURE

An aircraft rocket ejection seat system characterized by the lateral separation of the seats, upon ejection, with respect to the line of flight, at least one seat structure assembly having its center of gravity located to the right or left of the plane which is coincident with the line of thrust of the catapult-rocket.

---

The invention herein described may be manufactured and used by or for the Government of the United States of America for governmental purposes without the payment of any royalties thereon or therefor.

This invention involves catapult-rocket ejection seats which are employed as escape means when the occupants elect to free themselves of a distressed aircraft.

More particularly, it relates to airplane escape systems in which more than one ejection seat is installed in one aircraft, whether the seats are arranged in a tandem relationship, side by side, or in some staggered pattern.

In any escape system installation, it is highly desirable from the standpoint of elapsed time, that the ejection and subsequent parachute deployment occur rapidly, especially in certain flight circumstances, as for instance when an aircraft is at a very low altitude.

With time being an extremely critical factor between a successful and non-successful occupant recovery, it becomes highly desirable to execute an immediate and simultaneous ejection of the several seats as opposed to a time sequenced ejection wherein there is a time interval observed between the first seat ejection and a second or subsequent seat ejection.

In the past, however, multiple ejection seat installations demanded a time sequenced ejection system to avoid the creation of conditions which reduced the chances for successful recoveries. For instance, in a tandem arranged seat system the after located occupant would be ejected firstly to clear the after cockpit which would receive blast from the catapult rocket of the forwardly located ejection seat when it is propelled from the aircraft. Similarly a time separation must be allowed to avoid entanglement of the several seats and their parachute attachments as they are being deployed and/or after they have become inflated. Accordingly, a time separation between ejections has normally been forced upon the ejection system designer. However short in duration this time separation may be, it represents a capability limitation for the entire system. The present invention minimizes this time.

This invention recognizes that if the seats, in their ejection trajectories, could be sufficiently laterally separated with respect to the direction of the line of flight, there would be an absence of any requirement for a time sequenced ejection between seats. Ejection of the several seats could occur simultaneously upon the moment of triggering without the loss of critical time.

In the present invention the seat structure is arranged so that the center of gravity of the left and right seats is respectively displaced to the left and right of the lines of thrust of the rockets which propel the seats during ejection. This displacement causes the seats to turn off to the left and right during ejection, separating the seats and preventing collision. The center of gravity displacement is achieved by displacement of the parachute packs on the respective seats.

Other objects and many of the attendant advantages of this invention will become readily appreciated as the same becomes better understood by reference to the following detailed description when considered in connection with the accompanying drawings wherein.

Figure 1:
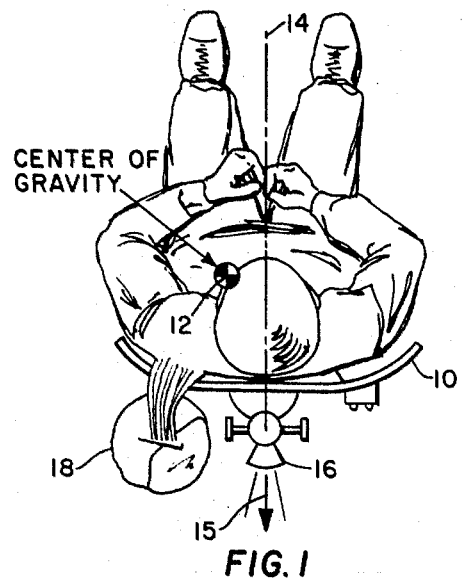
FIG. 1 is a view from above showing location of center of gravity of the seat-man mass with respect to the plane which is coincident with the line of thrust of the catapult-rocket.
Figure 2:
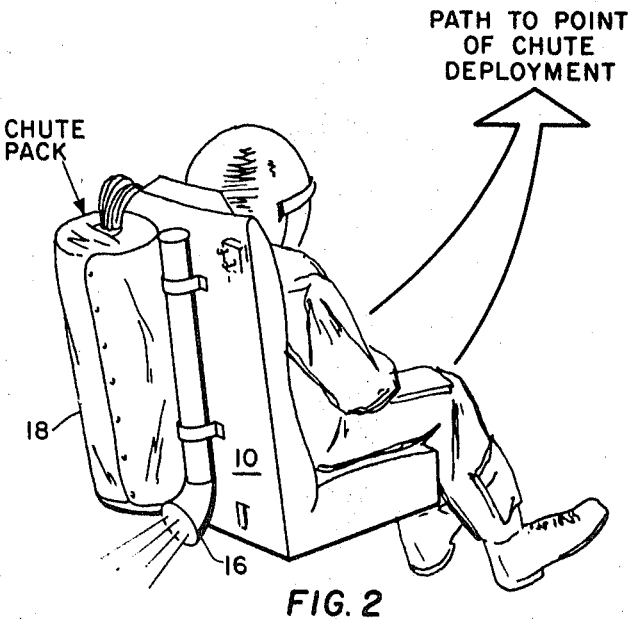
FIG. 2 is a perspective view of a preferred embodiment of the invention showing relative locations of ejector seat, pilot, catapult-rocket and chute pack.

This invention achieves this desired lateral separation of the seats by providing a seat structure assembly 10, as shown in FIG. 1, having its center of gravity 12 predeterminately located to the right or the left of the plane 14 which is coincident with the line of thrust 15 of the catapult-rocket 16. Thus, with ejection, the same rocket forces which function to propel the seat 10 clear of the aircraft are employed to introduce a turning moment to the seat-man mass. Further, this invention achieves this imbalance and resulting directional influence without the necessity of adding any weight or aerodynamic appurtenances to the seat structure by locating the personnel parachute pack 18 on the back of seat 10 and to one side, in such a position as to yield the desired asymmetrical loading. For example, as shown in FIG. 2, an ejected seat having the chute pack 18 attached to the left side of the seat back will describe a leftwardly biased trajectory as it is rocketed upwardly and clear of the aircraft.

Figure 3:
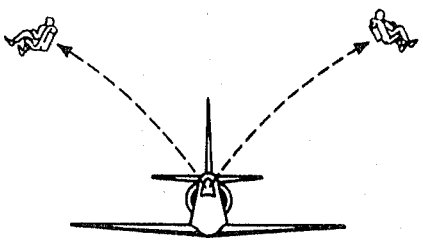
FIG. 3 is a view from behind an aircraft showing the simultaneous ejection of two aircraft seats and personnel with lateral separation.
Figure 4:
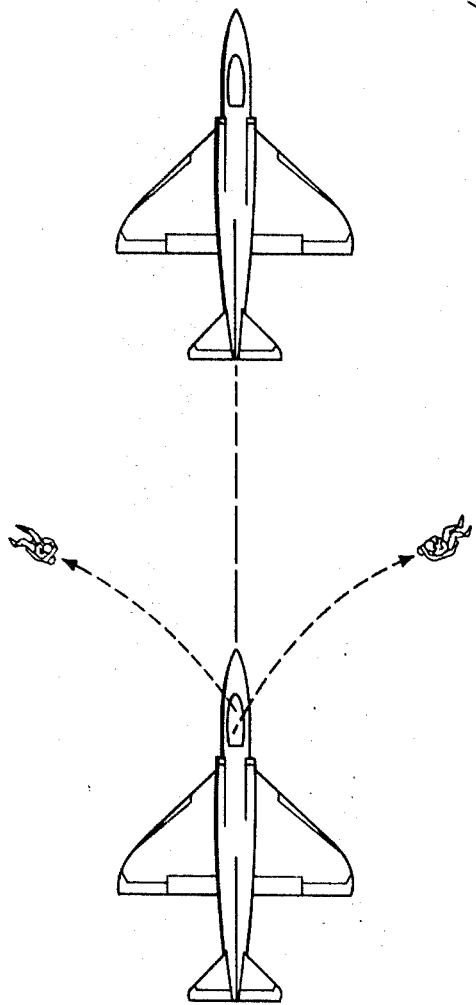
FIG. 4 is a view of FIG. 3 from above the aircraft.

Similarly and virtually simultaneously an ejected seat may be driven upwardly and to the right of the line of flight of the distressed aircraft if the chute pack is mounted on the right hand side of the seat to derive a turning moment in that direction. The simultaneously ejected seats will continue to describe diverging trajectories as they rise, effecting a lateral separation sufficient to allow chute deployment and inflation without chance of entanglement, as shown in FIGS. 3 and 4.

The technique of this invention is adaptable to any probable arrangement of ejection seat installation in an aircraft.

What is claimed is:

1. An aircraft rocket ejection seat system which avoids collision and entanglement when ejecting a plurality of seats simultaneously, comprising:
   (a) a plurality of seat structure assemblies for aircraft personnel, each assembly seat having a catapult-ejection-rocket and a parachute pack,
   (b) the center of gravity of each said seat assembly being predeterminately displaced to one side of the plane which is coincident with the line of thrust of said catapult-ejection-rocket,
   (c) said offset center-of-gravity creating an imbalance which upon ejection of said seat assembly causes the propulsion forces of said rocket which propel the seat assembly clear of the aircraft to introduce a turning moment thereto wherein upon simultaneous ejection of said seat assemblies lateral displacement separates said seats preventing collision.

2. A system as in claim 1 wherein said center of gravity displacement is achieved without the necessity of adding additional weight and aerodynamic appertenances to said seat structure assemblies by positioning said parachute pack to one side of the back of each seat assembly to yield the desired asymmetrical loading.

3. A system as in claim 1 wherein a pair of seat structure assemblies are side by side in the aircraft and when simultaneously ejected upward are also displaced to the right and left respectively.

References Cited

UNITED STATES PATENTS 3,186,662  6/1965  Martin _____ 244—122
3,222,015  12/1965  Larsen et al. _____ 244—122(X)

MILTON BUCHLER, Primary Examiner

C. A. RUTLEDGE, Assistant Examiner